United States Patent [19]

Hujik

[11] 3,880,562
[45] Apr. 29, 1975

[54] HEEL FILLING DEVICE
[75] Inventor: Ladislav Hujik, Batawa, Ontario, Canada
[73] Assignee: Bata Industries Limited, Batawa, Ontario, Canada
[22] Filed: Mar. 20, 1974
[21] Appl. No.: 453,161

[30] Foreign Application Priority Data
Mar. 30, 1973 Canada................................ 167591

[52] U.S. Cl. .............. 425/151; 425/119; 425/162; 425/168; 425/214; 425/261; 425/447; 425/449; 425/453
[51] Int. Cl. ................................................ B29c 5/00
[58] Field of Search ........... 425/119, 151, 162, 168, 425/214, 261, 447, 449, 453

[56] References Cited
UNITED STATES PATENTS
2,028,044  1/1936  Brousseau et al.............. 425/453 X
3,040,381  6/1962  Pioch........................... 425/453 X
3,448,496  6/1969  Arnold et al.................. 425/453 X
3,663,139  5/1972  Robbins et al................. 425/119 X
3,674,399  7/1972  Sendor......................... 425/453 X Primary Examiner—Robert L. Spicer, Jr.
Attorney, Agent, or Firm—Emory L. Groff, Jr.

[57] ABSTRACT

The heels of boots or other articles of footwear are formed in a slush moulding process by injecting a polymeric material, e.g., polyvinyl chloride into a heel cavity in a mould containing a skin of polymeric material. The heel cavity is filled using a device including a carriage which moves in synchronism with the mould and carries a dispensing head, which is thus constantly located over the heel cavity during a heel filling operation. A switch actuated by the heel of the mould causes the carriage to move with the mould, a second switch actuated by the mould carrier initiates a filling operation, and a third switch actuated by the carriage terminates a filling operation.

19 Claims, 12 Drawing Figures

HEEL FILLING DEVICE

BACKGROUND OF THE INVENTION

This invention relates to a device for filling a preselected portion of a mould used in a slush moulding process.

More specifically the invention relates to a heel filling device and in particular a device for filling the heel portions of moulds used in a slush moulding process for manufacturing footwear.

In the present case, the term footwear is intended to mean boots and shoes.

As described, for example, in Canadian Pat. Nos. 592,262 and 594,464, which issued to A. Cervinka on Feb. 9, 1960 and Mar. 15, 1960, respectively, calf-length boots are produced by a slush moulding process in which a mould in the shape of the boot is filled with a plastisol, e.g., polyvinyl chloride, the mould is heated to cause the plastisol to gel and form a skin of plastisol, excess plastisol is poured from the mould, and the mould is again heated to solidify the plastisol.

When moulding winter boots or the like with large heels, difficulties may be experienced in filling the heel cavity in the mould. It is necessary to fill the heel exactly, otherwise the finished product is uncomfortable to the point of being useless. In the past, the heel cavity was normally filled by an operator standing by a conveyor carrying the moulds. As each mould passed the heel filling station, the operator inserted a nozzle on the end of a flexible duct into the mould and opened the nozzle to fill the heel cavity. As well as being a tedious operation, it is unlikely that such a manner of filling heel cavities would be accurate, i.e., for a given heel cavity size, the quantity of liquid polymeric material would vary from one dispensing operation to the next. Accordingly, a need has existed for an automatic filling device for accurately filling a preselected portion of a mould, and in particular the heel cavity in a boot mould.

One attempt to an automatic heel filling device of the type described herein is disclosed by the K. R. Rybka Canadian Pat. No. 871,222, issued May 18, 1971. The device in question is somewhat rudimentary and includes a solenoid operated, stationary valve for dispensing plastisol into a moving mould. One problem with such an arrangement is that the plastisol dispensed into the mould will not necessarily flow directly into the heel, i.e., there is a danger of missing the heel with at least part of the liquid plastisol.

An object of the present invention is to provide a device for automatically filling a preselected portion of a mould.

Another object of the invention is to provide an automatic heel filling device, which accurately fills the heel cavities of footwear moulds with a liquid polymeric material, without requiring an operator in constant attendance.

SUMMARY OF THE INVENTION

Accordingly, the present invention provides a filling device for use with a moulding apparatus in which moulds carried by mould carriers are fed along a conveyor seriatim, said device comprising track means extending parallel to the path of travel of said moulds; carriage means for movement along said track means; dispensing means on said carriage means for dispensing a polymeric material into each said mould; first switch means for actuation by each said mould to cause said carriage means to move from an initial position along said track means with said mould, with the dispensing means aligned with a portion of said mould to be filled; second switch means for actuation by a mould carrier to start dispensing of polymeric material through the dispensing means into said portion of the mould; third switch means for actuation by said carriage means for stopping dispensing of said polymeric material; and means for returning said carriage with the dispensing means to said initial position.

With particular reference to the moulding of footwear, the present invention provides a heel filling device for use with a footwear moulding apparatus in which moulds carried by mould carriers are fed along a conveyor seriatim and provided with a skin of polymeric material defining a heel cavity, said device comprising track means extending parallel to the path of travel of said moulds; carriage means for movement along said track means; dispensing means on said carriage means for dispensing a polymeric material into each said mould; first switch means for actuation by each said mould to cause said carriage means to move from a rest position along said track means with said mould, with the dispensing means aligned with said heel cavity; second switch means for actuation by a mould carrier to start dispensing of polymeric material through said dispensing means into said heel cavity; third switch means for actuation by said carriage means for stopping dispensing of polymeric material; and means for returning said carriage with the dispensing means to said rest position.

DESCRIPTION OF THE PREFERRED EMBODIMENT

Figure 1:
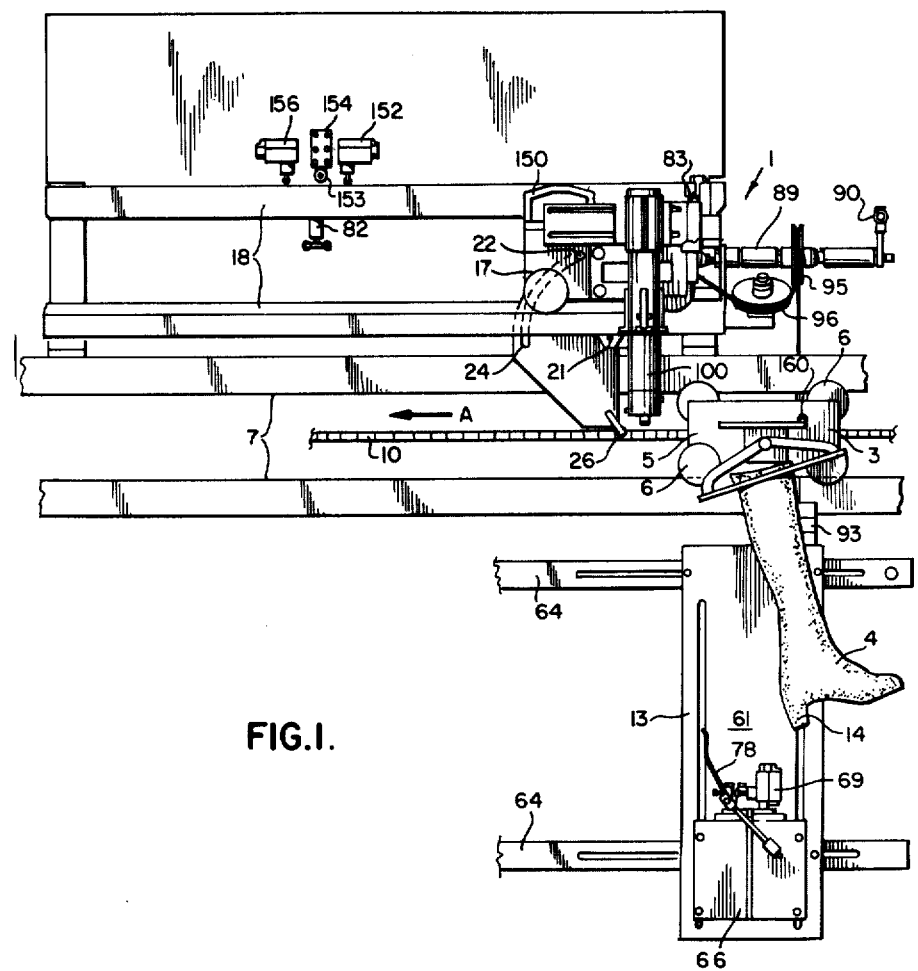
FIGS. 1 to 3 are elevation views of a boot moulding apparatus with a heel filling device in accordance with the present invention in an initial position, at the start of a filling operation and at the end of a filling operation, in that order.
Figure 2:
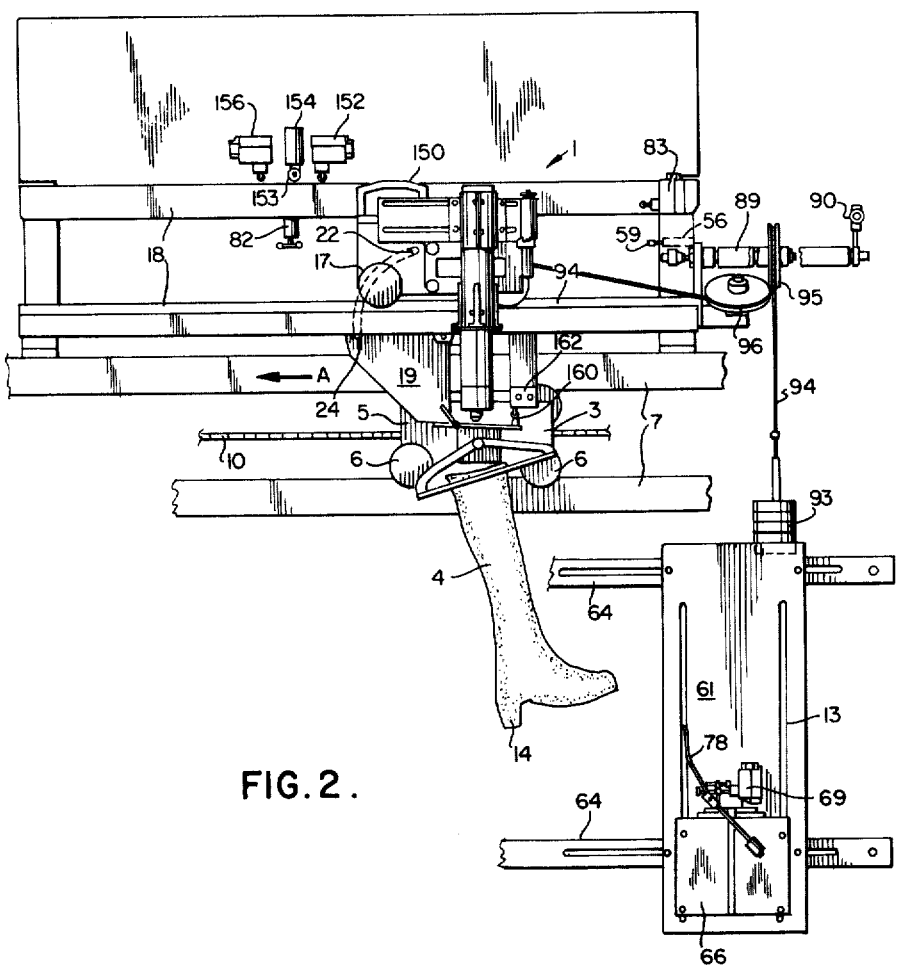
Figure 3:
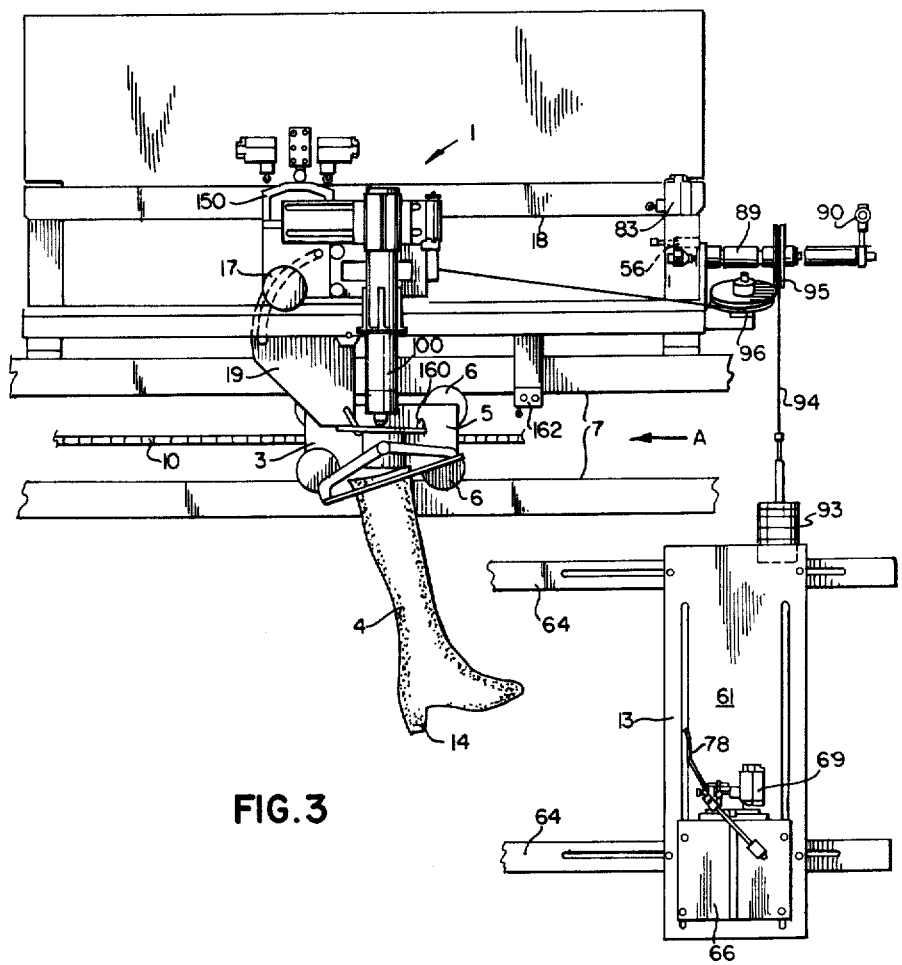

With reference to the drawings and in particular FIGS. 1 to 3, a heel filling device constructed in accordance with the present invention is generally designated 1 and is used on a slush moulding apparatus which includes a plurality of mould carriers 3 for carrying moulds 4 (only one shown). The moulds 4 are pivotally mounted on a shaft extending outwardly from the main body 5 of the mould carriers 3 which are provided with wheels 6 for riding on tracks 7. The moulds 4 and the carriers 3 form part of a continuous conveyor, which also includes a chain 10 for pulling the carriers 3 and moulds 4 in the direction of arrow A.

Figure 4:
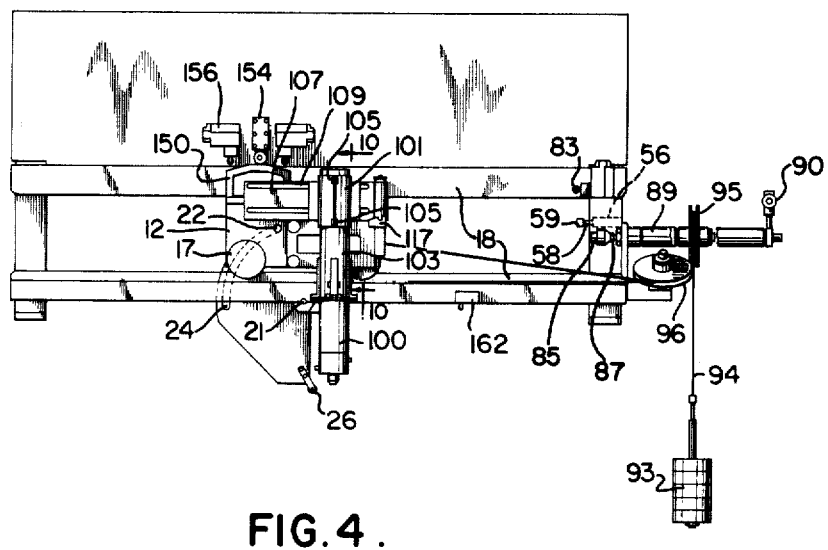
FIG. 4 is an elevation view of the carriage portion of the device of FIGS. 1 to 3 on a larger scale.

The heel filling device 1 includes a carriage 12 (FIGS. 4 to 6) movably mounted on the frame of the moulding apparatus, a heel actuable switch assembly 13 mounted beneath the mould carriers 3 for actuation by a heel 14 of a mould 4 and other switches, which are described more fully hereinafter.

The carriage 12 is in the form of a frame 15 with grooved top and bottom wheels 16 and 17, respectively for movably mounting the carriage 12 on tracks 18 rigidly mounted on the frame of the moulding apparatus above the chain 10 and the mould carriers 3. A plate 19 is pivotally mounted on a fixed plate 20 of the frame 15 for rotation about a horizontal axis defined by a bolt 21. A pin 22 projects through an arcuate slot 24 in the pivot plate 19 for guiding the plate during rotation about the bolt 21. The lower end of the plate 19 is provided with a roller 26 in a bifurcated bracket 27 for engaging each mould carrier 3 in a manner described more fully hereinafter.

Figure 7:
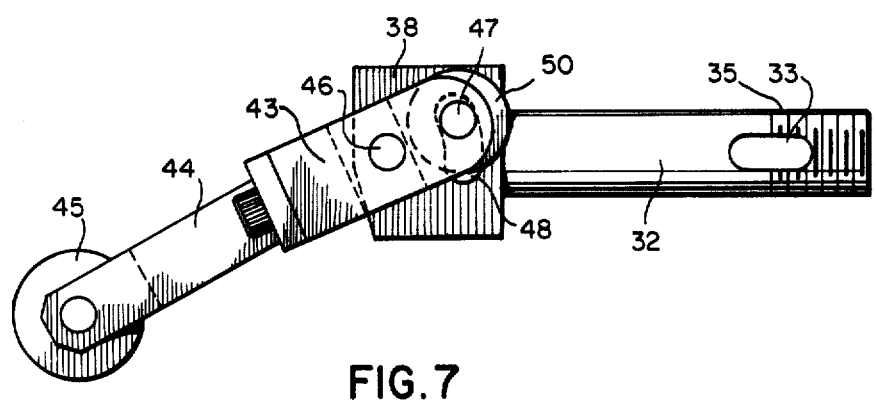
FIG. 7 is a plan view of part of a clutch assembly portion of the device of FIGS. 1 to 5.
Figure 8:
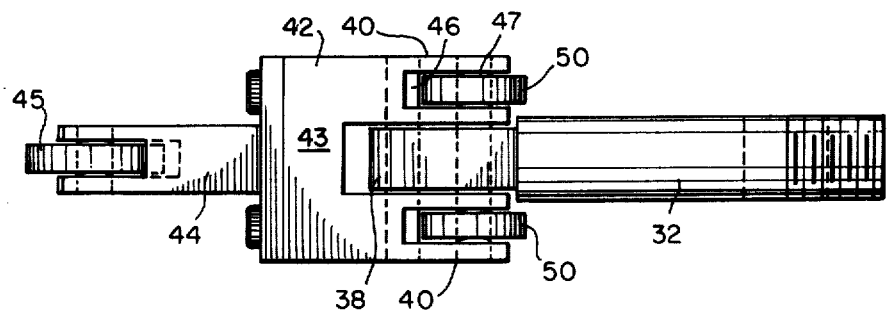
FIG. 8 is an elevation view of the assembly of FIG. 7.

While the plate 19 is normally rotatable with respect to the frame 15, the two elements can be locked together by means of a clutch assembly, generally indicated at 30. As shown in FIGS. 7 and 8, the clutch assembly 30 includes a shaft 32 with a longitudinally extending slot 33 near one threaded end 35 thereof for adjustably mounting the shaft 32 in an internally threaded sleeve 37 on the frame 15 of the carriage. A screw (not shown) projects into the slot 33 when the shaft 32 is mounted on the frame 15 to prevent rotation of the clutch assembly relative to the frame. The sleeve 37 is independent of the frame 15 for movement on the shaft 32. The other end portion 38 of the shaft 32 is generally rectangular and extends between two bifurcated arms 40 of a generally U-shaped bracket 42, which includes an end portion 43 interconnecting the arms 40, and a lever 44 having a roller 45 at its outer end.

A pair of pins 46 and 47 extend through the arms 40 and the end portion 38 of the shaft 32, the lever 43 being rotatable about the pin 46, whereby the bight of the U-shaped bracket, i.e., the end portion 43 bears against the rectangular end portion 38 of the shaft 32 when the lever 44 is rotated. The end portion 38 of the shaft 32 includes an arcuate slot 48 in which the pin 47 slides, the ends of the slot 48 defining the limits of rotation of the lever 43 about the pin 46. A pair of rollers 50 are mounted in the arms 40 of the bracket 42, one on each side of the rectangular end portion 38 of the shaft 32.

The clutch assembly 30 also includes disc springs 52 mounted on the shaft 32 and bearing against thrust washers 53 and 54. The washer 53 bears against a clutch pad 55, i.e., a piece of abrasive material such as brake lining, which in turn bears against the plate 19. The washer 54 bears against the rollers 50. Thus, when the lever 44 is rotated about the pin 46 from the position shown in FIG. 7 to a position in which the longitudinal axes of the shaft 32 and of the lever 44 are aligned, the rollers 50 are pushed against the washer 54 to compress the springs 52, which in turn bear against the washer 53 and pad 55 to force the plate 19 against the fixed plate 20 of the frame 15. Thus, the plate 19 is locked to the frame 15, so that no rotation occurs about the bolt 21. By rotating the sleeve 37, the shaft 32 can be moved towards or away from the centre of the frame 15 to adjust the tension on the springs 52, and thus the force holding the plates 19 and 20 together.

The lever 44 is pivoted about the pin 46 from the position of FIG. 7 by a clutch actuation cylinder 56 (FIG. 4) which is mounted on the apparatus frame between the tracks 18. The cylinder 56 includes a piston rod 58 with an enlarged outer end 59 for movement in the direction of travel of the carriage 12 to engage the lever 44 and move it into alignment with the shaft 32, causing the plates 19 and 20 to lock together. The clutch cylinder 56 is caused to operate by the heel switch assembly 13.

The heel switch assembly 13 is mounted on the frame of the moulding apparatus beneath the mould carriers 3. The switch assembly includes an inner plate 61 connected by bolts 62 and nuts (not shown) to slotted to longitudinally extending bars 64 on the apparatus frame permitting longitudinal adjustment of the switch assembly 13 on the frame of the apparatus. An outer plate 66 is secured to the inner plate 61 by bolts 67 extending through vertical slots 68 in the last mentioned plate, whereby the vertical position of the switch assembly 13 on the apparatus frame can also readily be adjusted. The location of the switch assembly 13 should be adjustable, so that the heel filling device can be used with moulds 4 of various sizes and shapes.

Figure 5:
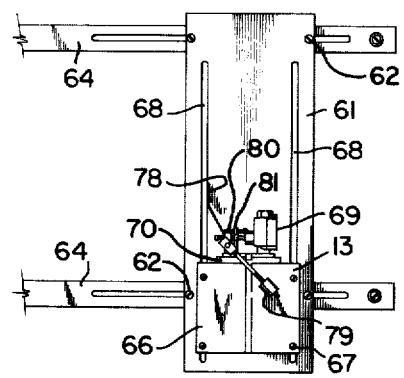
FIG. 5 is an elevation view of a heel actuable switch assembly used in the device of FIGS. 1 to 3.
Figure 6:
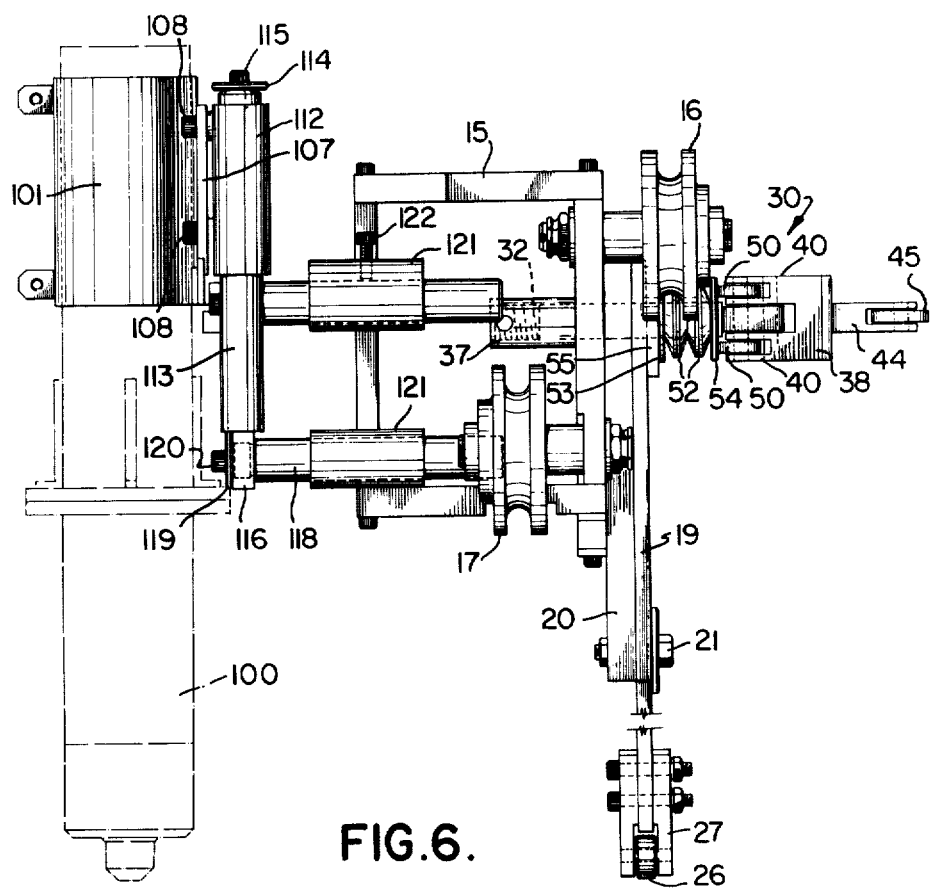
FIG. 6 is an end view of the carriage of FIG. 4, when viewed from the right of FIG. 4.
Figure 9:
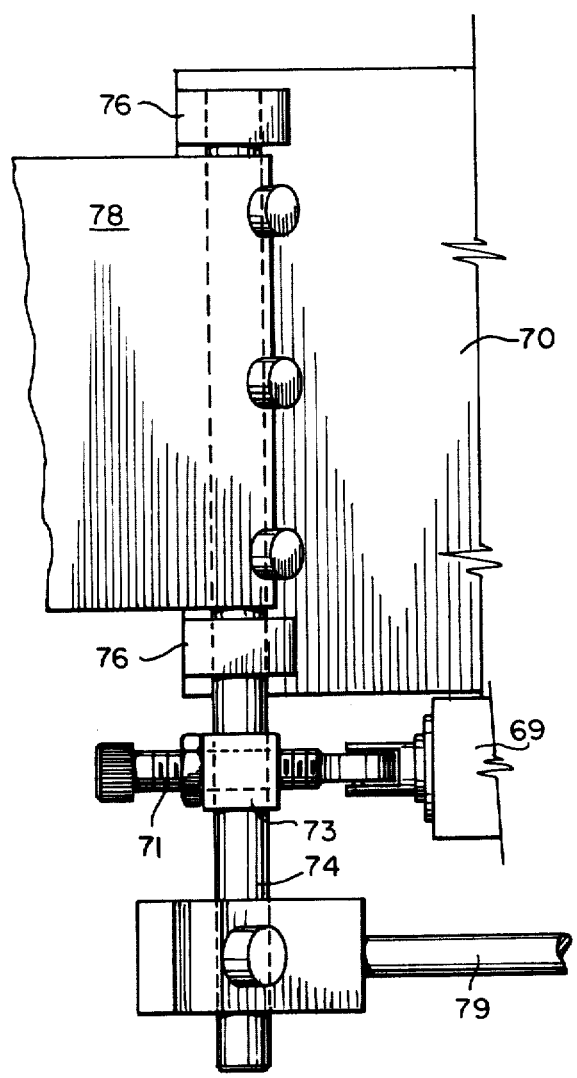
FIG. 9 is a plan view of a portion of the switch assembly of FIG. 5.

Referring now to FIGS. 5 and 9, a microswitch 69 is mounted on a horizontal arm 70 of the outer plate 66. The switch 69 is opened and closed by a pin 71 extending through a sleeve 73 on a shaft 74, which is rotatably mounted in posts 76 extending upwardly from the arm 70. A switch plate 78 is fixedly secured to the shaft 74 for rotation therewith between the posts 76 when engaged by the heel 14 of a mould 4. The outer end of the shaft 74 is provided with a counterweight 79 for returning the switch plate 78 to the position shown in FIG. 5, i.e., against the microswitch 69. A stop pin 80 is also provided in a vertical post 81 on the arm 70 for limiting return movement of the switch plate 78.

The lever 43 is returned to its initial position (FIG. 7), in which it defines an obtuse angle with the shaft 32 by a clutch release arm 82 on the frame of the apparatus between the tracks 18. The arm 82 is fixed and, during travel of the carriage 12, the lever 43 runs into the arm to return the latter to its initial position. The plates 19 and 20 thus disengage, and the pivot plate 19 is free to pivot upwardly about the bolt 21 to disengage the carriage 12 from the mould 4. Thus released the carriage is free to return to an initial position for the start of another heel filling cycle.

The carriage 12 is returned to the initial or starting position of FIG. 1 where it bears against a switch 83 on the apparatus frame and a plunger 85. The plunger 85 is merely a pad on the enlarged end of a piston rod 87, which extends into a pneumatic cylinder 89 also mounted on the apparatus frame. The cylinder 89 is provided with a flow control valve 90 through which air under pressure is introduced into the cylinder, and through which such air is permitted to escape slowly when pressure is applied to the plunger 85. Thus, the cylinder 89 effectively cushions the return of the carriage 12 to prevent damage to the apparatus incorporating the filling device. The carriage 12 is returned to such initial position by a counter-weight 93 connected to the carriage 12 by a cable 94 extending around pulleys 95 and 96.

A dispensing head 100 for dispensing liquid polymeric material, e.g., heat hardenable polyvinyl chloride to each mould 4 is mounted in a bracket 101. The bracket 101 is in the form of a sleeve, in which a vertical extension 103 (FIG. 4) of the dispensing head 100 is mounted. The sleeve is split; the sides of the split being interconnected by nuts and bolts 105, so that the head 100 can be moved vertically.

Figure 10:
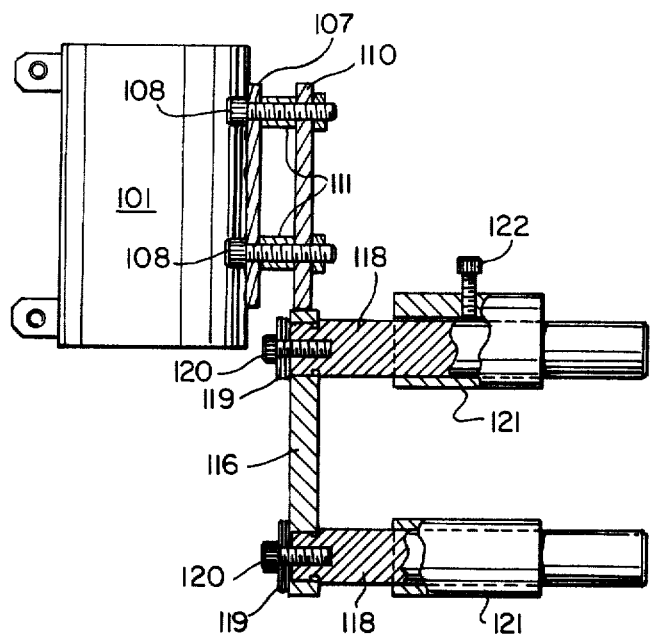
FIG. 10 is a cross-sectional view of the outer portion of the carriage taken generally along the line 10—10 in FIG. 4.

The bracket 101 is provided with an outer plate 107 (FIGS. 4, 6 and 10), which includes pins 108 projecting through longitudinally extending slots 109 in an inner plate 110. The plate 107 is spaced from the inner plate 110 by spacer sleeves 111. Thus, the dispensing head 100 is also longitudinally adjustable on the frame 15 of the carriage. A cylinder 112 is welded or otherwise secured to one end of the inner plate 110. A shaft 113 extends upwardly through the cylinder 112 and is secured therein by a washer 114 and screw 115. A bottom plate 116 is welded to the shaft 113, and such plate 116 is connected to the frame 15.

Thus, the outer plate 107 and inner plate 110 can be rotated relative to the bottom plate 116 to move the dispensing head 100 in a horizontal arc for servicing. A locking plate 117 with a notched, arcuate upper surface is provided on the upper end of the shaft 113 for retaining the head 100 in the servicing position.

The bottom plate 116 is connected to the frame 15 by shafts 118 with outer ends of a reduced diameter extending through the plate 116 and held therein by washers 119 and screws 120. The shafts 118 are slidably mounted in sleeves 121 on the frame 15, and are secured therein by screws 122. Thus, the position of the dispensing head 100 relative to the frame 15 can also be transversely adjusted.

Figure 11:
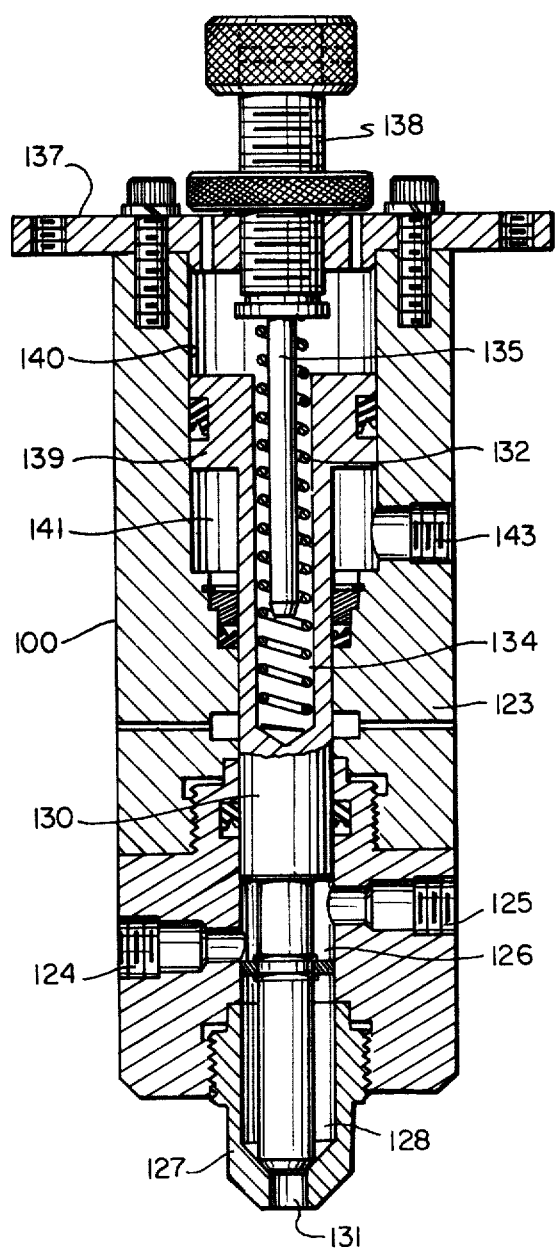
FIG. 11 is a cross-sectional view of the dispensing head for the device of FIGS. 1 to 3.

As best shown in FIG. 11, the dispensing head 100 includes a tubular casing 123 with an inlet duct 124 and an outlet duct 125 therein. The ducts 124 and 125 are in constant fluid communication with a longitudinally extending central passage 126. A nozzle 127 with a through passage 128 is mounted in the bottom end of the passage 126. A plunger 130 is slidably mounted in the central passage 126 for closing an orifice 131 in the nozzle 127. The plunger 130 is biased downwardly against the walls around the orifice by a helical spring 132 in a central cavity 134 of the plunger 130. The spring is maintained in the cavity 134 by a pin 135 extending downwardly from a top plate 137 closing the top of the passage. The upper end of the pin 135 is enlarged and threaded, and is provided with a knurled nut 138 for adjusting the tension on the spring 132. The upper end 139 of the plunger is enlarged for dividing the passage 126 into separate chambers 140 and 141. A duct 143 communicates with the lower chamber 141, whereby air under pressure can be introduced into the lower chamber 141 to move the plunger 130 upwardly, opening the nozzle 127 and permitting the flow of plastisol therefrom. When the air pressure is reduced in the chamber 141, the helical spring 132 returns the plunger to its rest position closing the orifice 131.

By providing an air duct in the casing 123 above the upper end 139 of the plunger 130, the spring 132 and the pin 135 could be omitted, i.e., the operation of the plunger 132 and thus the opening and closing of the nozzle 127 could be performed entirely pneumatically.

The main object to be achieved is precise opening and positive dripless closing of the nozzle 127 at the end of a dispensing step.

Figure 12:
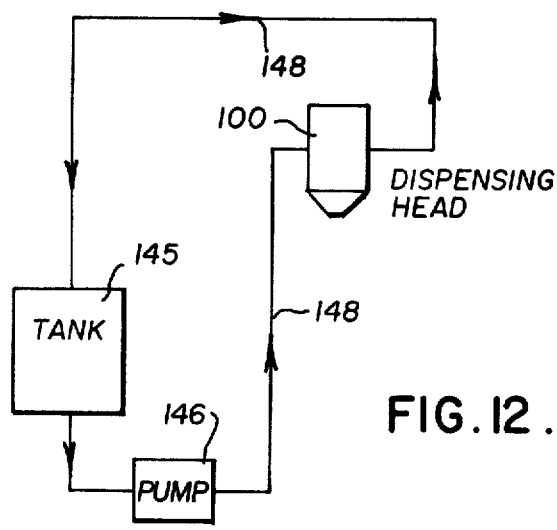
FIG. 12 is a schematic flow diagram of a dispensing circuit incorporating the head of FIG. 11.

The dispensing head 100 forms part of a plastisol feed circuit (FIG. 12), which includes a tank 145 containing liquid heat gellable plastisol, a pump 146 for pumping the plastisol from the tank 145 to the dispensing head 100 and back to the tank 145, and pipes 148. The tank 145 is a double walled container, which can be water cooled to prevent gelling of the plastisol in the tank. Moreover, the plastisol is constantly circulated through the circuit of FIG. 11, whereby gelling of the plastisol in the system is prevented or at least kept to a minimum. The pump 146 is a constant displacement pump, the speed of which can be varied, i.e., at any pump speed the quantity of plastisol fed through the system in each unit of time is constant.

A cam plate 150 extends upwardly from the top of the main body of the frame 15 for actuating a switch 152 (FIG. 2) fixedly mounted on the frame of the moulding apparatus for stopping a dispensing step. The cam plate 150 also depresses a plunger 153 of a pneumatic valve 154, which is in a pneumatic circuit (not shown) with the plunger 85 at the rest or initial position of the carriage 12. A safety switch 156 is provided beyond the valve 154 to shut off the entire moulding apparatus if the carriage 12 advances beyond a predetermined position, which means that the pivot plate 19 has failed to disengage the mould carrier 3 at the end of the moulding step.

Referring again to FIGS. 1 to 3, in operation, a mould carrier 3 with a mould 4 attached thereto advances from the right in FIG. 1 travelling in the direction of the arrow A, and the heel 14 of the mould hits the switch plate 78 to close the switch 69. Thus, the cylinder 56 is actuated to lock the plates 19 and 20 together, whereby the carriage 12 is caused to move with the mould carrier 3 and the mould 4, the nozzle 127 being aligned with the heel cavity. At this point in time, i.e., when the carriage 12 moves away from its rest position, the switch 83 is closed whereby a circuit (not shown) is completed to enable the remainder of the heel filling operation to be completed. Thus, the switch 83 is, in effect, a first safety switch which prevents the dispensing step unless the carriage 12 is moving with the mould carrier 3.

Referring now to FIG. 2, with the mould 4, mould carrier 3 and the carriage 12 moving together in the direction of arrow A, a cam or lug 160 on the mould carrier 3 closes a switch 162 extending downwardly from the lower track 18 of the carriage 12 to open the nozzle 127 in the dispensing head 100 and initiate filling of the heel cavity. The lug 160 can be moved longitudinally on the mould carrier 3, so that the duration of the dispensing step can be varied. Thus, the filling device can be used with heels or other articles having different volumes, and, by moving the lug 160, the quantity of plastisol or other polymeric material can be matched to the volume to be filled.

The mould 4 and the dispensing head 100 continue to move together in synchronism throughout the dispensing step, with the nozzle 127 accurately aligned with the heel cavity. The nozzle 127 remains open until the cam plate 150 hits the switch 152 (FIG. 3) which terminates the dispensing step, i.e., stops the supply of air or other fluid medium under pressure to the chamber 141 in the casing of the dispensing head 100 whereby the spring 132 can return the plunger 130 to the nozzle closing position of FIG. 11.

Shortly after closing of the nozzle 127, the cam plate 150 opens the pneumatic valve 154 to supply air under pressure to the cylinder 89 causing extension of the piston 87 of the plunger 85 for cushioning the return of the carriage 12. Approximately simultaneously, the lever 44 of the clutch assembly 30 runs into the clutch release arm 82 to return the lever 44 to the position of FIG. 7 where it defines an obtuse angle with the shaft 32. The pressure of the springs 52 holding the plates 19 and 20 together is thus released and the plate 19 is rotated around bolt 21 by the mould carrier 3, which continues to move in the direction of the arrow A. As mentioned hereinbefore, if the carriage 12 continues to move with the mould carrier 3 beyond the pneumatic valve 154, the cam plate 140 closes the switch 156 to shut off the entire moulding apparatus.

Thus released, the carriage 12 is free to return to the initial or rest position, (FIG. 1). Such return is effected by the counterweight 93. When the carriage 12 strikes the plunger 85, air is relatively slowly released from the cylinder 89 through the valve 90 to slow the return movement of the carriage. The carriage 12 then bears against the switch 83, which opens a circuit preventing dispensing or any other operation of the device in the absence of a mould 4. Another mould carrier 3 and mould 4 approach and then actuate the heel switch assembly 13 to repeat the above operations. It will be noted that the absence of a mould 4 prevents movement of the carriage 12 with the mould carrier 3, and consequently dispensing. Normally, one shoe or boot size is produced in one continuous run. When the size of the article to be moulded is changed, the location of the switch plate 78 is altered to ensure that the heels of the new moulds will actuate the switch 69, the location of the lug 160 on the carrier 3 is adjusted to change the duration of the dispensing step, and the dispensing head 100 can be moved vertically, longitudinally or transversely relative to the frame 15, if necessary.

While the usual plastisol is polyvinyl chloride, it will be appreciated that other materials, which may or may not be heat hardenable polymeric material can be dispensed using the device of the present invention. When using polyvinyl chloride as the plastisol, the moulds 4 are heated after the dispensing step to gell the polyvinyl chloride in the heel cavity, but the apparatus performing such operation forms no part of the present invention.

While the specific description of the invention has been limited to the filling of a heel cavity in a boot mould, it will be appreciated that the filling device could be used for dispensing almost any flowable material into a preselected portion of a mould. However, the invention is best suited to an apparatus for slush moulding articles of footwear.

I claim:

1. A filling device for use with a moulding apparatus in which moulds carried by mould carriers are fed along a path of travel seriatim, said device comprising track means extending parallel to the path of travel of said moulds; carriage means for movement along said track means; carrier engaging means for moving said carriage means along said track means in synchronism with said mould carrier and mould; dispensing means on said carriage means for dispensing a mouldable material into each mould; first switch means for actuation by a mould to cause said engaging means to engage a mould carrier, whereby the carriage means moves from a rest position along said track means with said mould; second switch means for actuation by a mould carrier to start dispensing of said mouldable material through said dispensing means; third switch means for actuation by said carriage means for stopping dispensing of mouldable material; and means for returning said carriage means with the dispensing means to said rest position.

2. A device according to claim 1, wherein said carrier engaging means includes a pivot plate mounted for rotation on said carriage means; and a clutch assembly on said carriage means for locking the pivot plate in a carrier engaging position.

3. A device according to claim 2, wherein said first switch means includes a switch assembly for actuation by each successive mould; and a clutch cylinder which acts in response to actuation of said switch assembly for engaging said clutch assembly to lock the plate in said carrier engaging position.

4. A device according to claim 1, wherein said mouldable material is dispensed vertically into a preselected portion of said mould, said carriage means including frame means, and means mounting said dispensing means for vertical, longitudinal and transverse movement on said frame means, whereby the location of the dispensing means relative to the mould can be adjusted.

5. A filling device for use with a footwear moulding apparatus in which moulds, each carried by a mould carrier, are fed by a conveyor seriatim along a path of travel, said device comprising track means extending parallel to the path of travel of said moulds; carriage means for movement along said track means; carrier engaging means for moving said carriage means along said track means in synchronism with said mould carrier and mould; dispensing means on said carriage means for dispensing a polymeric material into each mould; first switch means for actuation by a mould to cause said engaging means to engage a mould carrier, whereby the carriage means moves from a rest position along said track means with said mould; second switch means for actuation by a mould carrier to start dispensing of said polymeric material through said dispensing means; third switch means for actuation by said carriage means for stopping dispensing of polymeric material; and means for returning said carriage with the dispensing means to said rest position.

6. A device according to claim 5, wherein said carrier engaging means includes a pivot plate mounted for rotating on said carriage means, and said engaging means including a clutch assembly on said carriage means for locking the plate in a carrier engaging position.

7. A device according to claim 6, wherein the moulds are boot moulds having a heel cavity, said first switch means including a switch assembly for actuation by the heel of each successive mould to cause the clutch assembly to engage a mould carrier with the dispensing means aligned with the heel cavity.

8. A device according to claim 7, wherein said engaging means includes a clutch cylinder which acts in response to actuation of said switch assembly to engage said clutch assembly and lock the pivot plate in said carrier engaging position.

9. A device according to claim 6, wherein said means for returning the carriage to said rest position includes means for engaging the clutch assembly to release the pivot plate from said carrier engaging position.

10. A device according to claim 9, including cushion means for cushioning the return of said carriage to the rest position.

11. A device according to claim 5, wherein said polymeric material is heat hardenable polyvinyl chloride, said dispensing means including a dispensing head; a reservoir for said polyvinyl chloride; and a pump for circulating said polyvinyl chloride from said reservoir through said dispensing head and back to said reservoir.

12. A device according to claim 11, wherein said dispensing head includes a tubular casing defining a longitudinally extending passage; an inlet duct in said casing for introducing polyvinyl chloride into said passage from the pump; and outlet duct for discharging polyvinyl chloride from said passage to the reservoir, said inlet and outlet ducts being in constant fluid communication; a nozzle at one end of said passage; or orifice in said nozzle for discharging polyvinyl chloride from the dispensing head into a mould; a plunger slidably mounted in said passage normally closing said orifice; means for moving said plunger away from said orifice to open the nozzle; and means for returning said plunger to an orifice closing position to terminate dispensing of polyvinyl chloride.

13. A device according to claim 12, wherein said means for moving the plunger away from said orifice includes a head on said plunger dividing a portion of said passage into first and second chambers; a duct for introducing air under pressure into the first chamber to move the plunger away from said orifice; and spring means for returning said plunger to the orifice closing position.

14. A device according to claim 7, including plate means movably mounted on the moulding apparatus and supporting said switch assembly, whereby the location of the switch assembly can be changed for use with moulds of varying sizes.

15. A device according to claim 5, including a lug movably mounted on said mould carrier for actuating said second switch means.

16. A device according to claim 10, including pneumatic valve means disposed in the path of travel of said carriage means for actuating said cushion means at the end of a dispensing step and immediately preceding return of the carriage means to said rest position.

17. A device according to claim 1, including a safety switch located in the path of travel of said carriage means beyond said third switch means for terminating operation of the entire moulding apparatus in the event that the carriage means fails to return to the rest position following a dispensing operation.

18. A device according to claim 1, including fourth switch means normally opened by said carriage means in the rest position for preventing dispensing while the carriage means is in said rest position.

19. A device according to claim 5, including means for adjusting the position of said dispending means on said carriage means, whereby the device can be used with moulds of varying sizes and shapes.

* * * * *